Sept. 2, 1930.  H. J. SPENCER  1,774,676
RACE TRACK
Filed June 5, 1928  3 Sheets-Sheet 1
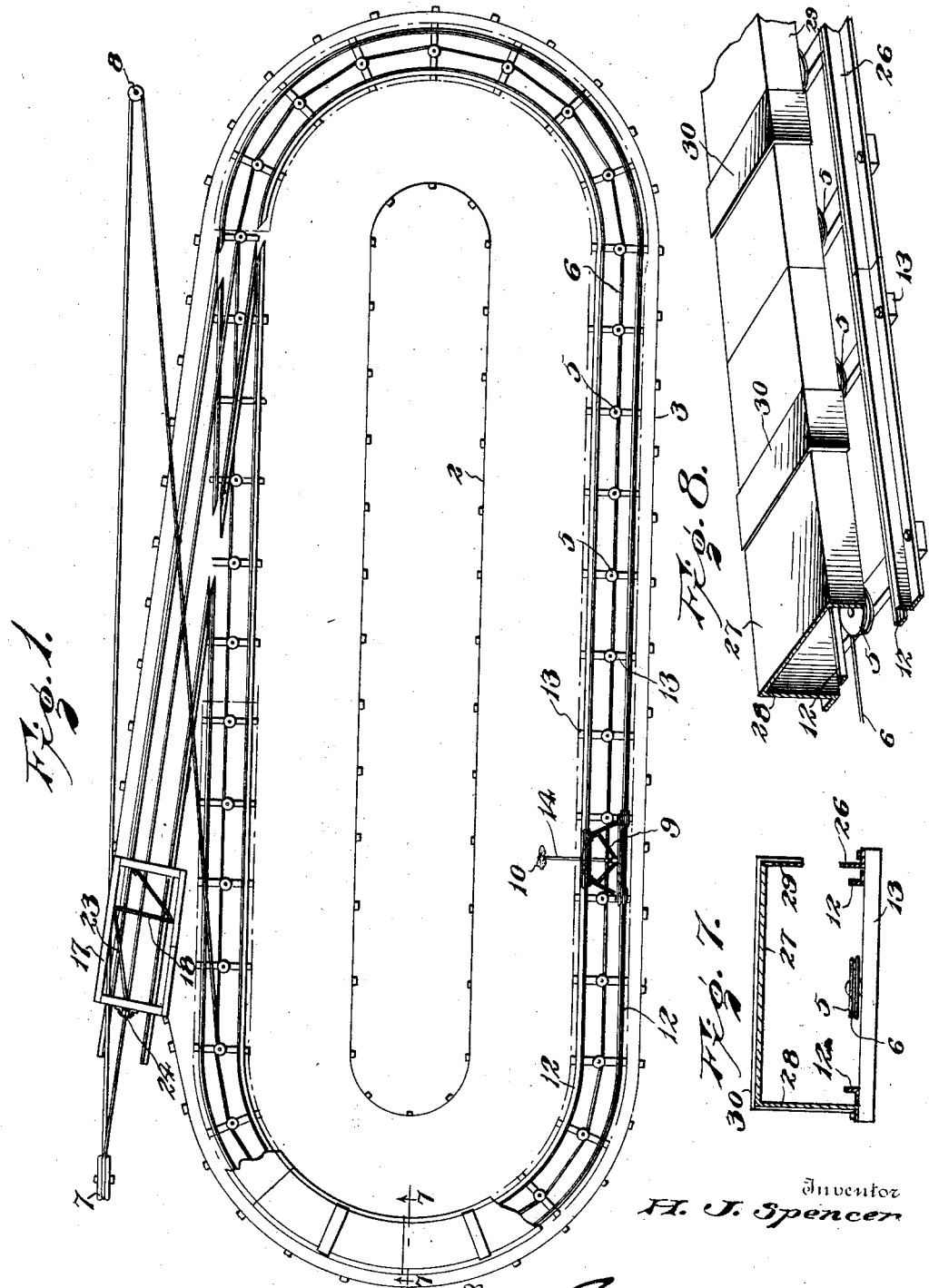
Inventor
H. J. Spencer
By Lacey & Lacey, Attorney Sept. 2, 1930.  H. J. SPENCER  1,774,676
RACE TRACK
Filed June 5, 1928   3 Sheets-Sheet 2
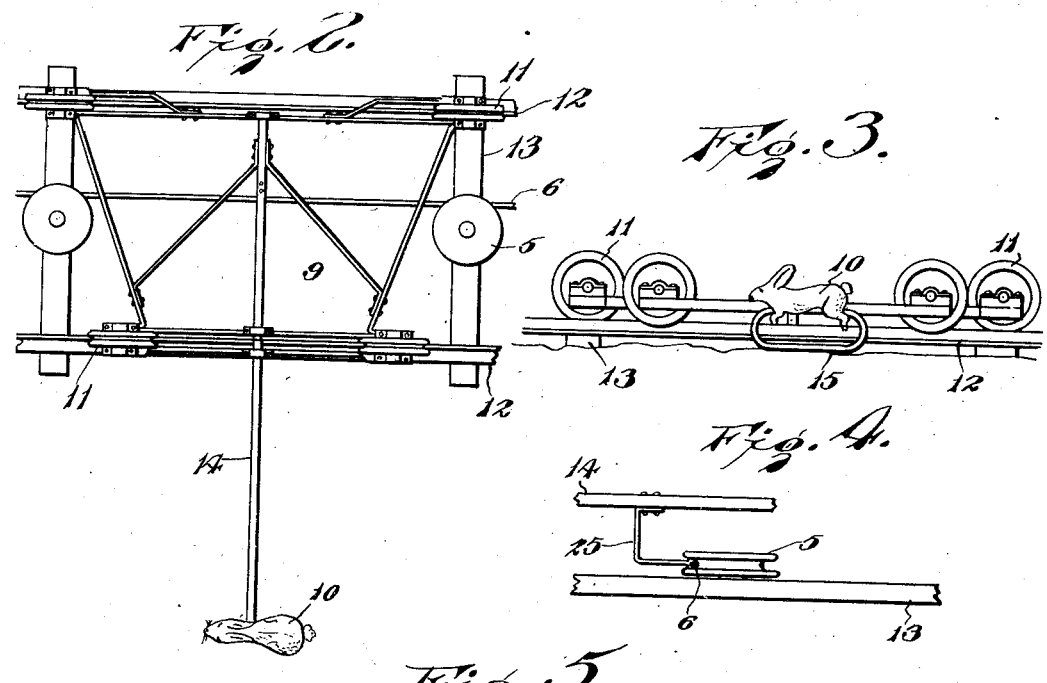
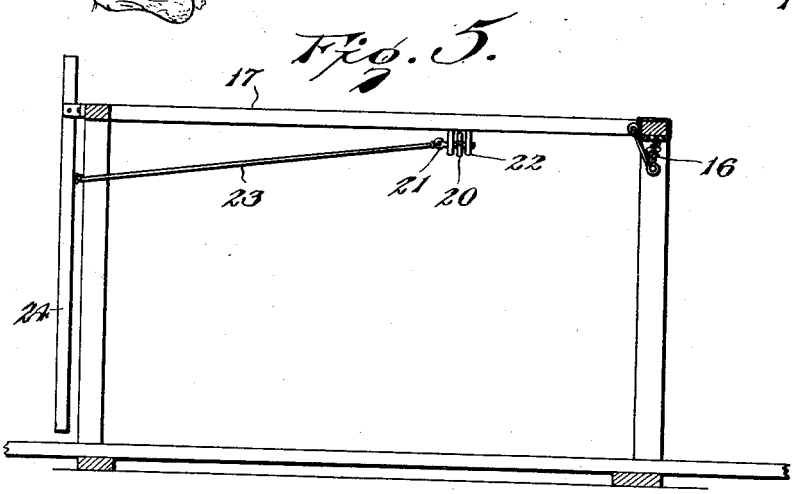
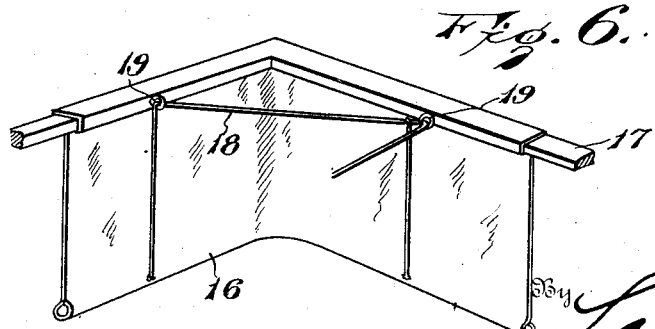
Inventor
H. J. Spencer
By Lacey & Lacey, Attorneys Sept. 2, 1930.     H. J. SPENCER     1,774,676
RACE TRACK
Filed June 5, 1928     3 Sheets-Sheet 3
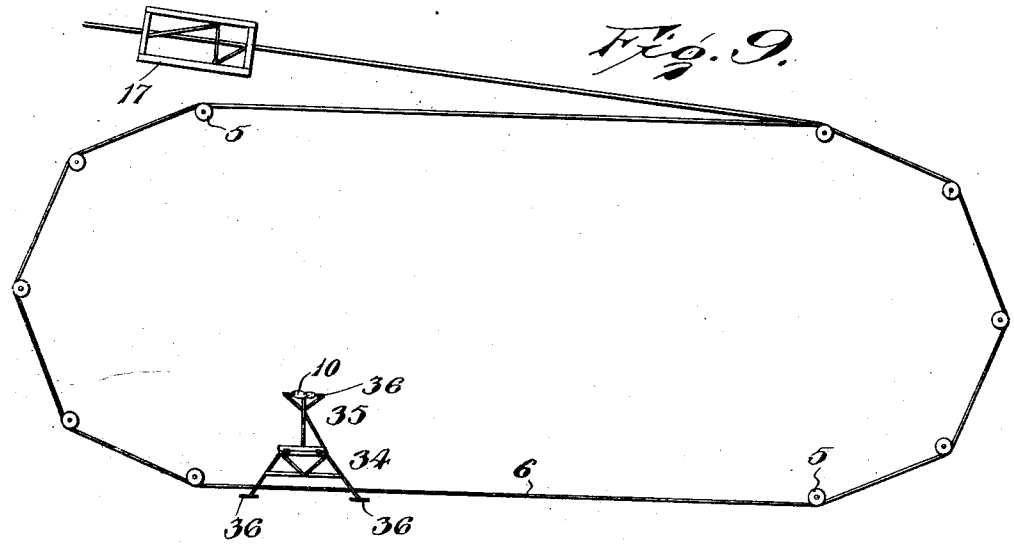
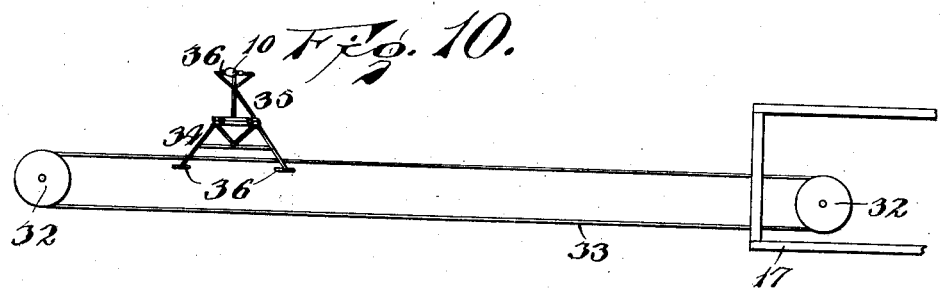
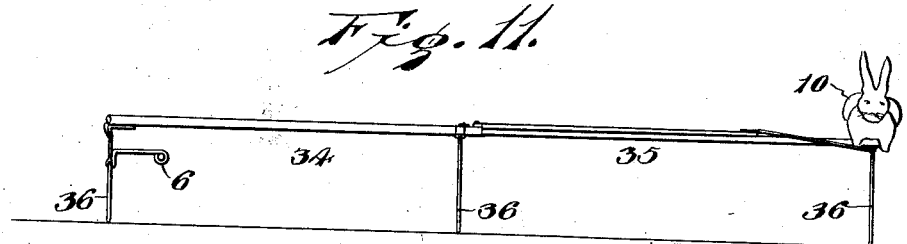
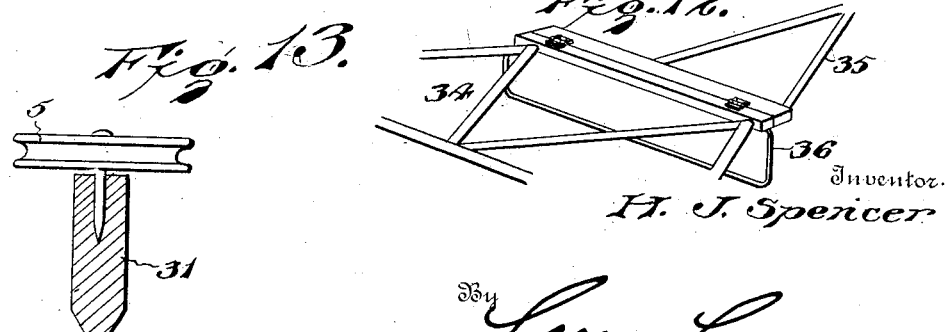
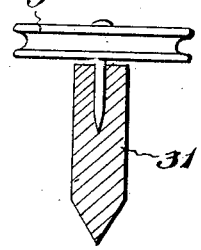
Inventor.
H. J. Spencer
By Lacey & Lacey, Attorney.

Patented Sept. 2, 1930

1,774,676

UNITED STATES PATENT OFFICE

HARVEY J. SPENCER, OF WICHITA, KANSAS

RACE TRACK

Application filed June 5, 1928. Serial No. 283,059.

This invention relates to a coursing event wherein the usual live animal is replaced by a dummy which, to all appearances, presents the characteristics of the real lead in form and action.

The invention contemplates means for moving a lure or decoy over the track, a suitable mount admitting of a freedom of movement of the lure in simulation of a live rabbit, and an escape for the safe retreat of the lure at the end of the course.

While the drawings illustrate a preferred embodiment of the invention it is to be understood that in adapting the means to meet specific needs and requirements, the design may be varied and such other changes in the minor details of construction may be resorted to within the scope of the invention as claimed, without departing from the spirit thereof.

For a full understanding of the invention and the merits thereof, reference is to be had to the following description and the drawing hereto attached, in which,—

Figure 1 is a top plan view of a race track embodying the invention.

Figure 2 is a top plan view of the carriage and adjunctive parts.

Figure 3 is a side view of the parts illustrated in Figure 2.

Figure 4 is a fragmentary view of a portion of the carriage, cable and guide means.

Figure 5 is a sectional view of the escape.

Figure 6 is a detail perspective view of a portion of the escape.

Figure 7 is a detail sectional view on the line 7—7 of Figure 1 showing the parts on a larger scale.

Figure 8 is a detail perspective view of a portion of the track and housing.

Figure 9 is a top plan view of a portable track.

Figure 10 is a top plan view of a straight away track.

Figure 11 is a front view of the lure and carriage on an enlarged scale.

Figure 12 is a detail perspective view of a portion of the carriage.

Figure 13 is a detail view of a guide pulley and peg for the portable track.

Corresponding and like parts are referred to in the following description and designated in the several views of the drawings by like reference characters.

The course may be of any desired outline and, as shown, is elongated and enclosed between an inner fence 2 and an outer fence 3, whereby the hounds are confined to the chase. Guide pulleys 5 are located at intervals in the length of the course to give proper direction to a cable or cord 6 which is actuated when a race is on. The cable, or cord 6 may extend around the course any desired number of times according to the distance to be run. If the circuit corresponds to one quarter of a mile the distance may be doubled by extending the cable or cord 6 twice around the course. By extending the cable or cord around the course four times the distance of the race will be increased to one mile. The first and the last runs of the cable or cord 6 pass around a drive pulley 7 and a guide pulley 8 at one side of the course, as indicated most clearly in Figure 1 of the drawings. The drive pulley 7 may be operated in any determinate way either by hand or power and for convenience said drive pulley may consist of a rear drive wheel of a motor vehicle which is elevated from the ground so as to run free.

The numeral 9 denotes a mount or carriage for the lure or dummy animal 10 provided as the lead for the hounds. The lure or dummy animal 10 appears as a jack-rabbit, although it may have any form desired as a lead for the chase. The carriage 9 includes wheels 11 which are grooved and mounted upon rails 12 which constitute a track. Ties 13 connect the rails 12 and receive the guide pulleys 5 which are grooved to give proper support to the cable or cord 6. An arm 14 is connected in any preferred manner to the carriage 9 and projects therefrom a distance to properly position the lure or dummy animal 10 upon the course to keep the hounds or dogs away from the track so as not to be injured by coming in contact therewith. As indicated most clearly in Figure 1 of the drawings the track is adjacent the outer side of the course 1. The natural tendency of the hounds is to keep close to the inner side of the course which represents the shortest distance. Any suitable support 15 may be provided at the outer end of the arm 14 to carry the weight of the lure or decoy 10. The arm 14 may be slender and resilient, thereby resulting in the dummy 10 simulating a life-like action by reason of the support 15 running over the rough ground which imparts a variety of movement to the dummy approximating the action of a live animal when running and leaping.

An escape is located at the end of the chase and includes a curtain 16 and a supporting structure 17. The curtain 16 is weighted at its lower edge and comprises angularly disposed portions, as shown most clearly in Figure 6 of the drawings, one of the portions extending at a right angle to the course and the other paralleling the course. The curtain 16 is elevated, as indicated most clearly in Figure 5 of the drawings, and is tripped at the end of the chase to conceal the lure and prevent access of the hounds thereto. A running cord 18 is attached to the lower weighted edge of the curtain 16 and passes through guide eyes 19 at the top of the supporting structure of frame work 17. A ring 20 at the free end of the operating cord 18 is adapted to be engaged by means of a pin 21 which also loosely engages a guide 22 mounted upon the structure 17. A cord 23 attached to the pin 21 is connected to a lever 24 which is pivoted at its upper end to the structure 17 and extends within the path of the carriage 9 to be tripped thereby at the end of the race, thereby releasing the curtain 16 which drops by reason of its lower weighted edge, and shuts off the lure from the hounds or dogs. A suitable connection 25 forms connecting means between the cable or cord 6 and the carriage or arm 14.

The foregoing relates to a stationary track and to prevent any possible injury to the dogs a suitable housing is provided to enclose the ties 13, rails 12 and guide pulleys 5. This housing preferably consists of sheet metal parts formed in lengths and attached to the ties 13. One of the parts consists of a rail 26 which is attached to an end of the ties 13. The companion part includes a top portion 27 and side portions 28 and 29. The side portion 29 alines vertically with the rail 26 and is spaced therefrom a distance to receive the arm 14 of the carriage 9. The portion 28 is attached to the opposite end of the ties 13. In this manner the housing encloses the several parts and prevents the dogs from coming in contact therewith. The over-hanging portion of the housing is strengthened and reinforced by straps 30 which are attached at one end to the ties 13 and extend along the parts 27, 28 and 29 to which they may be attached in any preferred way.

In the portable form of tracks illustrated in Figure 9 the guide pulleys 5 are mounted upon pegs 31 which are driven into the ground at the ends of the course. The cable or cord 6 is free along the side runs and lies upon the ground. The numeral 17 denotes the escape. This arrangement admits of the track being readily set up at any suitable point and removed after the race and stowed for use at a future event or at a different point.

Figure 10 represents a straight way course wherein two guide pulleys 32 are located at the ends of the course and support the cord or cable 33. The numeral 17 denotes the escape which is preferably located at an end of the course for the disappearance of the lure at the end of the race.

The carriage provided for the portable and straight way tracks includes an inner section 34 and an outer section 35. These sections are hingedly connected as indicated most clearly in Figure 12 of the drawings. Runners 36 support the ends of these sections 34 and 35. By having the outer section 35 hingedly connected to the inner section 34 the lure 10 is free to move vertically in simulation of the leaps of a live animal.

Having thus described the invention, I claim:

1. The combination with a course, a cable at the outer side of the course and passing therearound a number of times, a guide and a drive pulley at the outer side of the course and having the first and last runs of the cable passing therearound, a carriage connected to the cable, an arm projecting inwardly from the carriage and a lure or dummy animal at the free end of the arm.

2. The combination with a course having a plurality of pulleys therearound, of an endless cable trained around the pulleys a number of times, a guide pulley and a driving pulley adjacent the course, said cable having stretches engaged around the latter pulleys, a carriage connected with the cable, a lure connected with and movable with the cable upon movement being imparted thereto through the medium of the driving pulley.

In testimony whereof I affix my signature.

HARVEY J. SPENCER. [L. S.]